(12) United States Patent
Winters

(10) Patent No.: US 11,780,608 B2
(45) Date of Patent: Oct. 10, 2023

(54) AIRCRAFT RECOVERY DOLLY

(71) Applicant: Mason Jess Winters, Price, UT (US)

(72) Inventor: Mason Jess Winters, Price, UT (US)

( * ) Notice: Subject to any disclaimer, the term of this patent is extended or adjusted under 35 U.S.C. 154(b) by 0 days.

(21) Appl. No.: 17/501,789

(22) Filed: Oct. 14, 2021

(65) Prior Publication Data
US 2022/0033107 A1 Feb. 3, 2022

Related U.S. Application Data

(63) Continuation-in-part of application No. 17/218,034, filed on Mar. 30, 2021, now Pat. No. 11,648,800.

(60) Provisional application No. 63/002,282, filed on Mar. 30, 2020.

(51) Int. Cl.
| B60B 30/10 | (2006.01) |
| B64F 5/50 | (2017.01) |
| B60P 1/44 | (2006.01) |
| B60P 1/52 | (2006.01) |
| B60P 3/11 | (2006.01) |

(52) U.S. Cl.
CPC .............. B64F 5/50 (2017.01); B60P 1/4407 (2013.01); B60P 1/52 (2013.01); B60P 3/11 (2013.01)

(58) Field of Classification Search
CPC ......... B60B 30/02; B60B 30/04; B60B 30/10; B60P 1/4407
USPC ....................................................... 414/429
See application file for complete search history.

(56) References Cited

U.S. PATENT DOCUMENTS

| 1,361,889 | A | * | 12/1920 | Miller | B60B 29/002 105/157.1 |
| 3,501,037 | A | * | 3/1970 | Donovan | B60B 29/002 414/427 |
| 3,830,387 | A | * | 8/1974 | Virnig | B60B 29/002 414/427 |
| 3,830,388 | A | * | 8/1974 | Mott | B60B 29/002 414/427 |
| 6,450,756 | B1 | * | 9/2002 | Stahancyk | B64F 1/224 244/50 |
| 7,097,406 | B1 | * | 8/2006 | Gang | B60B 29/002 254/105 |
| 8,459,926 | B2 | * | 6/2013 | Hedley | B60B 29/002 414/429 |
| 10,179,659 | B2 | * | 1/2019 | Rivard | B64F 1/224 |
| 10,226,964 | B2 | * | 3/2019 | Rucchetto | B60B 29/002 |
| 2010/0166531 | A1 | * | 7/2010 | Bauer | B66F 9/183 414/429 |

* cited by examiner

*Primary Examiner* — Jonathan Snelting
(74) *Attorney, Agent, or Firm* — MORRISS O'BRYANT COMPAGNI CANNON, PLLC

(57) ABSTRACT

A wheel dolly for lifting and transporting a flat tire attached to an aircraft is comprised of a frame assembly having first and second laterally spaced frame members that are pivotally coupled to each other at one side. A ram is interposed between the first and second frame members. A pair of tire lifting and support assemblies are pivotally coupled the frame assembly. A plurality of wheels is coupled to the frame assembly to allow the frame assembly to roll in any direction.

20 Claims, 7 Drawing Sheets

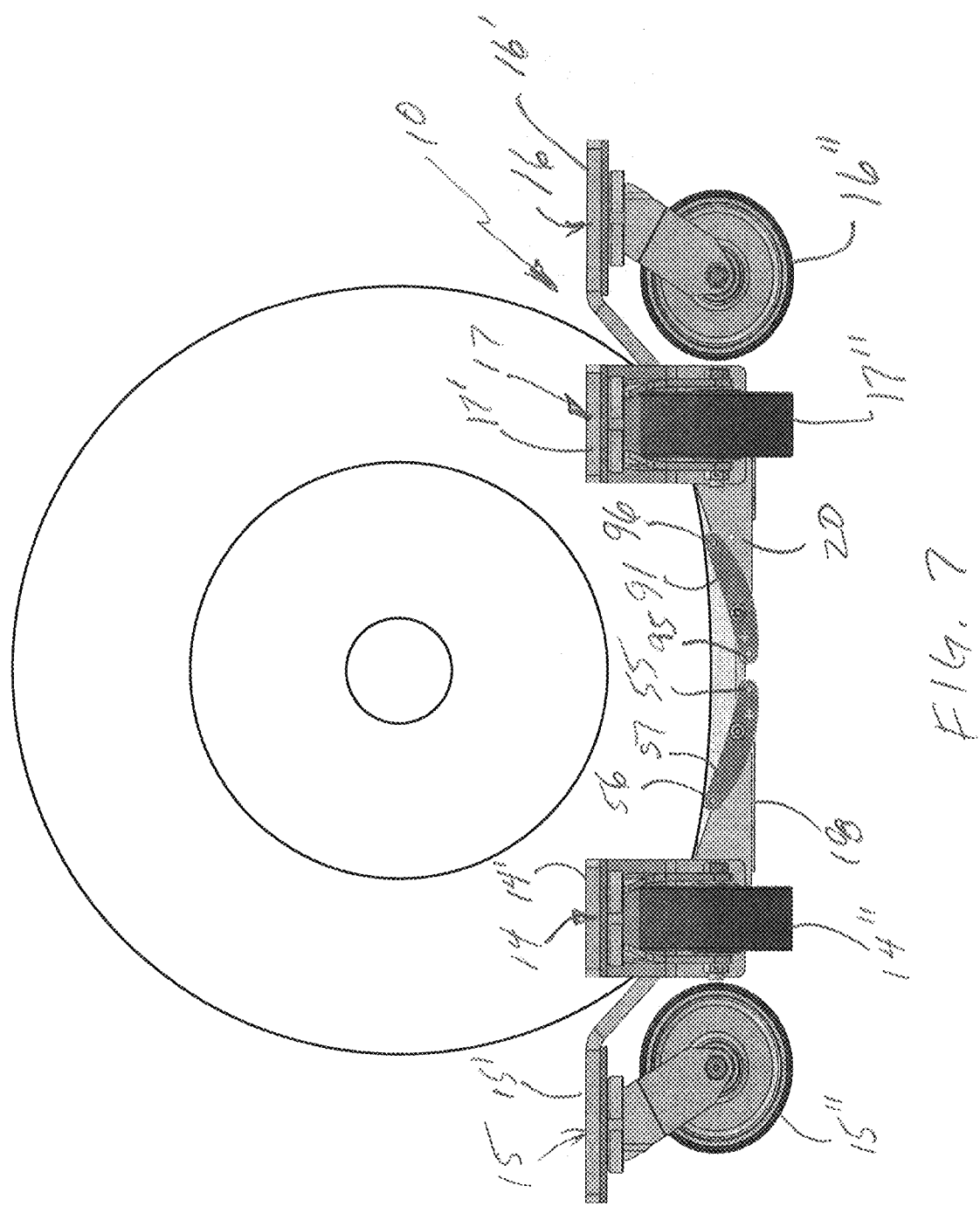

AIRCRAFT RECOVERY DOLLY

CROSS-REFERENCE TO RELATED APPLICATION

This application is a continuation-in-part of and claims priority to U.S. patent application Ser. No. 17/218,034 filed on Mar. 30, 2021, which claims priority to U.S. Provisional Patent Application Ser. No. 63/002,282 filed on Mar. 30, 2020, the entirety of each which is incorporated by this reference.

FIELD OF THE INVENTION

The present invention relates generally to a wheel dolly and, more specifically, to a wheel dolly particularly adapted for use with aircraft that allows an aircraft with one or more flat tires to be towed from a runway.

STATE OF THE RELATED ART

Various wheel dollies have been known primarily in the art for lifting and moving vehicular wheels. The wheel dollies may be used separately, in pairs or in any number corresponding to the number of wheels on a vehicle. Wheel dollies have been described in the art as consisting of two horizontal arms that are brought together toward the perimeter of a wheel. As the two arms are sufficiently brought together, the wheel is lifted from the ground and thus supported by the two arms and the wheel dolly.

Most prior art wheel dollies for vehicles are provided to move one or more wheels of a vehicle around a workshop. In such situations, the wheel is being moved a relatively short distance and on an even concrete surface such that the possibility of the wheel being dislodged from the wheel dolly is relatively low, even though the wheel is only supported by a pair of horizontally disposed arms. Moreover, such prior art wheel dollies are not particularly adapted for lifting a flat tire that is still attached to a vehicle in which case the weight of the vehicle makes it difficult if not impossible to get the horizontally disposed arms sufficiently under the tire to be able to raise it from the ground. Such prior art wheel dollies are thus not particularly adapted for use on a flat tire, especially a flat tire attached to an aircraft. Such prior art wheel dollies could result in pinching the tire, in being unstable during movement of the aircraft and/or in damaging to the aircraft. Moreover, such prior art wheel dollies are not particularly adapted to be driven over a distance under power of the vehicle.

A particular problem that exists at airports is that it is rather common for aircraft landing at the airport to experience a flat tire upon landing. This is often due to a harder than usual landing that causes one or more of the tires of the aircraft to blow. Once an aircraft has experienced a flat tire on landing, under normal circumstances, it cannot be moved from the runway until the flat tire has been replaced and the aircraft can then taxi from the runway. Obviously, the problem with such a situation is that the runway where the aircraft is parked while the flat tire is being replaced cannot be used. At smaller airports, especially single runway airports, this presents a particularly problematic and potentially dangerous situation. That is, if a runway of a single runway airport is closed due to an aircraft with a flat tire and another aircraft requires an emergency landing, there may be no safe place for the aircraft to land.

One particular solution for a wheel dolly for small aircraft is described in U.S. Pat. No. 9,108,463 to Winters (the '463 patent). The '463 patent discloses a wheel dolly for lifting and transporting a flat tire attached to an aircraft comprised of a frame assembly having first and second laterally spaced frame members and a telescopic frame structure interposed between the laterally spaced frame members. A pair of tire scoops are pivotally coupled the frame assembly. An actuator is coupled between the tire scoops to pivot the tire scoops relative to the frame assembly in order to raise the tire scoops. A plurality of castors is coupled to the frame assembly to allow the frame assembly to roll in any direction. The wheel dolly of the '463 patent, however, is not configured for handling wheels of various jet aircraft.

Thus, there exists a need in the art for a low-profile wheel dolly that may be used in rapid deployment to raise the wheel of jet aircraft that have experienced a flat tire, that allows the aircraft to taxi by being towed from the runway. The present invention provides a wheel dolly that is capable of safely and effectively addressing this need and others that will become apparent from description of the invention. The present invention is thus a significant improvement over wheel dollies known in the art.

SUMMARY OF THE INVENTION

Accordingly, the present invention provides a wheel dolly particularly configured for temporarily supporting and lifting a tire of an aircraft during taxi. The wheel dolly is configured for insertion beneath a flat tire still attached to the aircraft and safely lifts the flat tire off the ground. Once the flat tire has been lifted and supported by the wheel dolly, the aircraft can then be quickly and safely taxied from the runway, as by towing with a tug, tractor or other ground support transport equipment.

The wheel dolly may be configured to lift a wheel of an aircraft that weighs thousands of pounds, including those that weigh more than 8400 pounds having various wheel diameters and widths. The wheel dolly of the present invention is configured so that a single person can safely and easily operate it.

In one embodiment, a wheel dolly for lifting and transporting a flat tire attached to an aircraft comprises a frame assembly supported above a surface by a plurality of freely rotatable wheel assemblies. The frame assembly comprises first and second frame members coupled together via a first angled frame member fixedly attached at a first angle to a proximal end to the first frame member and a second angled frame member fixedly attached at a second angle to a proximal end to the second frame member. The first angled frame member is pivotally coupled at a distal end to a distal end of the second angled frame member. A ram has a first end pivotally coupled to the frame assembly proximate the distal ends of the first and second angled frame members and a second end pivotally coupled to the frame assembly proximate the proximal end of the second frame member. First and second oppositely opposed tire support assemblies are attached to the frame assembly. The first tire support assembly comprises a first tire support structure attached to a first frame member of the frame assembly and a second tire support structure attached to a second frame member of the frame assembly. Each tire support assembly is facing one other in opposite directions when the wheel dolly is in a tire lifting position. The first tire support assembly is comprised of a first plurality of cantilevered support members fixed to the first frame member and extending in a direction toward the second frame member. The second tire support assembly is comprised of a second plurality of cantilevered support members fixed to the second frame member and extends toward the first frame member such that when the frame assembly is in the tire lifting position distal ends of the first plurality of cantilevered support members are positioned proximate the distal ends of the second plurality of support members. A first pivotable roller assembly is pivotally coupled to and between the distal ends of the first plurality of support members. A second pivotable roller assembly pivotally coupled to and between the distal ends of the second plurality of support member. As such, extension of the ram causes the angle between the first and second angled frame members to decrease and retraction of the ram cause the angle between the first and second angled frame members to increase thereby correspondingly moving the first and second tire support structures toward and away from one another.

In another embodiment, a first mounting assembly is attached to and depends from the distal end of the first frame member. The distal end of the second angled frame member is pivotally coupled to the first mounting assembly. The first mounting assembly extends beyond the distal end of the second angled frame member. The first end of the ram is pivotally coupled to the first mounting assembly a distance from where the second angled frame member is pivotally coupled to the first mounting assembly.

In yet another embodiment, the first mounting assembly comprises a first plate attached to and extending from a top surface of the first frame member and a second plate parallel to the first plate and extending from a bottom surface of the first frame member.

In another embodiment, a second mounting assembly is attached to and depends from the distal end of the second frame member. The second end of the ram is pivotally coupled to the second mounting assembly so that extension or retraction of the ram causes the first mounting member to pivot relative to the distal end of the second angled mounting member thereby moving the first tire support structure relative to the second tire support structure.

In still another embodiment, the first angled frame member is angled relative to the first frame member approximately 150 degrees and the frame second angled frame member is angled relative to the second frame member approximately 135 degrees, with the angle formed between the first and second angled frame members being approximately 75 degrees in the tire lifting position.

In yet another embodiment, the distal end of the second angled frame member is pivotally coupled first and second plates of the first mounting assembly to allow for horizontal pivotal movement of the second angled frame member relative to the first and second plates while the first and second plates restrict movement of the second angled frame member relative to the first and second plates in a vertical direction by the engagement of the first and second plates with the second angled frame member.

In another embodiment, the first pivotable roller assembly comprises a first plurality of roller pivot mounts pivotally mounted to the first plurality of cantilevered support members and the second pivotable roller assembly comprises a second plurality of roller pivot mounts pivotally mounted to the second plurality of cantilevered support members.

In yet another embodiment, each of the first plurality of roller pivot mounts is attached at a first attachment point that is off center from a midpoint of a long axis of the first roller pivot mount, with the first attachment point being closer to a leading edge of the first roller pivot assembly and each of the second plurality of roller pivot mounts is attached at a second attachment point that is off center from a midpoint of a long axis of the second roller pivot mount.

In still another embodiment, a first set of rollers is each rotatably coupled to and between the first plurality of roller pivot mounts and a second set of rollers is each rotatably coupled to and between the second plurality of roller pivot mounts.

In another embodiment, the first plurality of pivot mounts are coupled together with at least one first rod and the second plurality of pivot mounts are coupled together with at least one second rod.

In yet another embodiment, the first set of rollers are rotatably coupled to the at least one first rod so that the first plurality of pivot mounts and first plurality of rollers pivot in unison.

In another embodiment, the second set of rollers are rotatably coupled to the at least one second rod so that the second plurality of pivot mounts and second plurality of rollers pivot in unison.

In yet another embodiment, each of the first and second plurality of rollers comprise a hollow cylinder with a respective one of the at least one first and second rods extending through each of the rollers and through and between each of the respective first and second pivot mounts.

In still another embodiment, the first plurality of support members are evenly spaced along the first frame member and the second plurality of support members are evenly spaced along the second frame member.

In another embodiment, each of the first and second roller support members is generally in the form of a right triangle with a base of each of the roller support members being substantially parallel to the ground and the top surfaces of each of the roller support members downwardly angled from their respective proximal ends that are attached to a respective one of the first and second frame members so that the top surfaces of each of the first and second plurality of support members are downwardly angled and extend from their respective first and second frame member to create an effective downwardly angled surface.

In another embodiment, in the tire lifting position, upper rollers of the first set of rollers rest upon respective top surfaces of the first plurality of support members and upper rollers of the second set of rollers rest upon respective top surfaces of the second plurality of support members.

In still another embodiment, in the tire lifting position, a center portion of the at least one first rod rests upon a respective top surface of one of the plurality of first support members and a center portion of the at least one second rod rests upon a respective top surface of one of the plurality of second support members.

In yet another embodiment, as leading rollers of the first and second plurality of rollers come into contact with a flat tire the leading rollers and their respective first and second roller assemblies are pivoted to a more vertical position.

In another embodiment, as the upper rollers of the first and second roller assemblies come into contact with the flat tire, upper portions of the first and second roller pivot mounts are forced to pivot from the more vertical position to a more horizontal position thereby lifting the leading rollers away from the ground and correspondingly lifting the flat tire off the ground.

In yet another embodiment, a hydraulic hand operated pump is attached to a top surface of the second frame member. The pump is hydraulically coupled to the ram so that hydraulic fluid in the pump can be forced into the ram to extend the ram to move the wheel dolly into a tire lifting position.

These and other aspects and advantages of the invention will become more apparent from the following detailed description thereof and the accompanying exemplary drawings.

BRIEF DESCRIPTION OF THE DRAWINGS

The following detailed description of the illustrated embodiments is better understood when read in conjunction with the appended drawings. For the purpose of illustrating the invention, there is shown in the drawings exemplary embodiments which illustrate what is currently considered to be the best mode for carrying out the invention, it being understood, however, that the invention is not limited to the specific methods and instruments disclosed. In the drawings:

FIG. 7 is a side view of the wheel dolly illustrated in FIG. 6.

DETAILED DESCRIPTION OF THE ILLUSTRATED EMBODIMENTS

Those of ordinary skill in the art will realize that the following description of the present invention is illustrative only and not in any way limiting. Other embodiments of the invention will readily suggest themselves to such skilled persons, including, without limitation, combinations of features of the illustrated embodiments. In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention. It should be noted that there are many different and alternative configurations, devices and technologies to which the disclosed inventions may be applied. Thus, the full scope of the invention is not limited to the examples that are described below.

Figure 1:
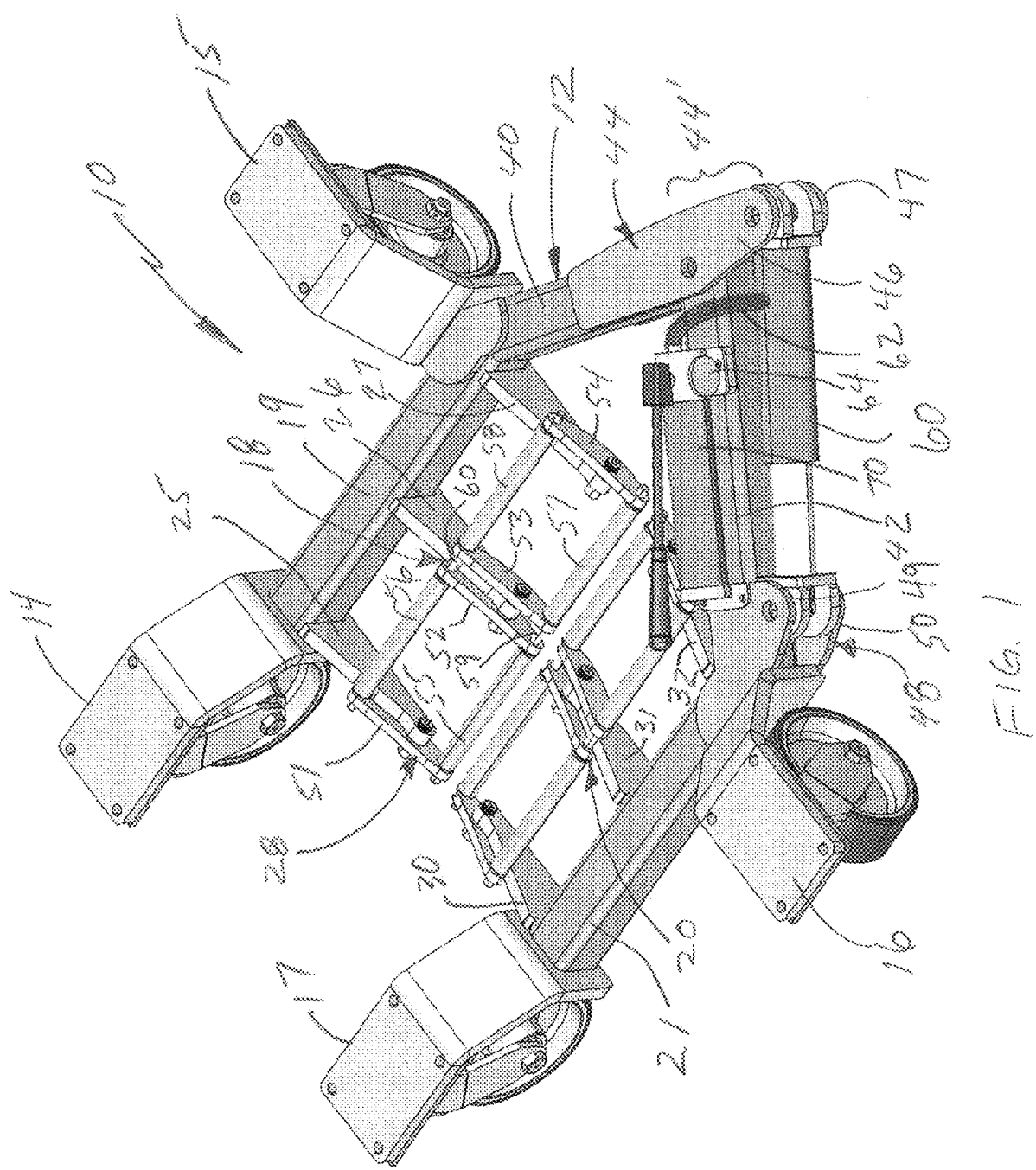
FIG. 1 is a perspective view of a wheel dolly in accordance with the principles of the present invention.

With reference now to the drawings in which like reference characters designate like or similar parts throughout the several views, FIG. 1 illustrates a wheel dolly, generally indicated at 10, in accordance with the principles of the present invention. The wheel dolly 10 is particularly configured for temporarily lifting and supporting one or more tires of an aircraft during taxi. The wheel dolly 10 is more importantly configured to lift and support one or more tires of an aircraft that have become flat upon landing to allow the aircraft to be taxied from a runway while the wheel dolly 10 is supporting the flat tire or tires of the aircraft.

The wheel dolly 10 is comprised of a frame assembly 12 supported by a plurality of wheel assemblies 14-17, which may be in the form of casters, with two wheel assemblies supporting each side of the frame assembly 12 above a surface, such as the runway or tarmac of an airport. Each wheel assembly 14-17 is freely rotatable a full 360 degrees relative to the frame assembly 12. A pair of oppositely opposed tire support assemblies 18 and 20 are attached to the frame assembly 12, with tire support structure 18 attached to frame member 21 and tire support structure 20 attached to frame member 23.

Each tire support assembly 18 and 20 are identically configured but face each other in opposite directions when the wheel dolly 10 is in the closed or lifting position as shown in FIG. 1. The tire support assembly 18 is formed from a plurality of cantilevered support members 25, 26 and 27 that are fixed to the frame member 19 and extend above the ground in a direction toward the frame member 21. Likewise, the tire support assembly 20 is formed from a plurality of cantilevered support members 30, 31 and 32 that are fixed to the frame member 19 and extend above the ground in a direction toward the frame member 19 such that when the frame assembly is in a closed or tire lifting position as shown, the distal ends of the support members 25, 26 and 27 are positioned proximate the support members 30, 31 and 32, respectively.

Pivotally attached to and between the distal ends of the support members 25, 26 and 27 is a pivotable roller assembly 28. The pivotable roller assembly 28 is comprised of four roller pivot mounts 51-54 that are pivotally mounted to the three support members 25, 26 and 27. Each roller pivot mount 51-54 is attached a point that is off center from the midpoint of the long axis of the roller pivot mount, with the attachment point being closer to the leading edge of the roller assembly 28. A set of four rollers 55-58 are each freely rotatably coupled to and between the roller pivot mounts 51-54 with rollers 55 and 56 coupled between the pivot mounts 51 and 52 and the rollers 57 and 58 coupled between the pivot mounts 53 and 54. Each of the pivot mounts 51-54 are also coupled together with rods 59 and 60 that extend through and between the pivot mounts 51-54 so that each of the pivot mounts 51-54 and associated rollers 55-58 pivot in unison. The rollers 55-58 each comprise a hollow cylinder, with rod 59 supporting rollers 55 and 57 and rod 60 supporting rollers 56 and 58 with the rollers being freely rotatable about the respective rods 59 and 60.

The support members 25-27 are evenly spaced along the frame member 19. Each of the roller support members 25-27 is generally in the form of a right triangle with the base of the roller support members 25-27 being parallel to the ground and the top surfaces of the roller support members 25-27 downwardly angled from their proximal ends that are attached to the frame member 19 in a cantilevered manner with the widest end of each roller support member 25-27 attached to a facing side of the frame 19 so as to inwardly extend toward the tire support assembly 20. Thus the top sides of the support members 25-27 are downwardly angled and extend from the frame member 19 to create an effective downwardly angled surface between all roller support members 25-27 that is higher proximate the frame member 19 and lower as it downwardly tapers in a direction toward the opposite frame member 21. The roller support member 25-27 essentially form a plurality of inwardly extending cantilevered fins or ribs that are spaced apart and support the pivoting roller assembly 28.

When the roller assembly 28 is in the position as shown in FIG. 1, which is the position of the roller assembly 28 when supporting a tire of an aircraft, one end of the roller 56 rests upon a top surface of the support member 25, an opposite end of the roller 58 rests upon the support member 27 and a center portion of the rod 60 rests upon the top surface of the support member 26. Semicircular recesses are formed in the top surfaces of the support members 25-27 for receiving and supporting the rollers 56 and 58 and rod 60 when in the lifting position as shown.

As the leading rollers 55 and 57 come into contact with a flat tire, as will be shown and described in more detail, the leading rollers 55 and 57 of the roller assembly 28 are pivoted downward near the ground so that the rubber from the flat tire will not bunch up beneath the front rollers 55 and 57. As the rollers 55 and 57 continue to move into the flat tire and wheel area, the upper rollers 56 and 58 come into contact with the tire and wheel. The longer upper portions of the roller pivot mounts 51-54 are leveraged against the wheel forcing the pivot mounts 51-54 to pivot from a more vertical position to a more horizontal position thereby lifting the front rollers 55 and 57 away from the ground and correspondingly lifting the flat tire off the ground.

The frame members 19 and 21 are coupled together via an angled frame member 40 fixedly attached at a proximal end to frame member 19 and angled frame member 42 fixedly attached at a proximal end to frame member 21 and pivotally coupled at a distal end to a distal end of the frame member 19 via longitudinally extending mounting structure 44 which depends in a longitudinal direction from the distal end of the frame member 40. The mounting structure 44 also extends beyond the distal end of the frame member 42 and includes a ram mounting portion 44'. A second ram mounting structure is attached to the distal end of the frame member 21 at an angle thereto toward a distal end of the frame member 40. The frame member 40 is angled relative to the frame member 19 at approximately 150 degrees and the frame member 42 is angled relative to the frame member 21 at approximately 135 degrees, with the angle between the frame members 40 and 42 being approximately 75 degrees when in the closed or lifting position as shown.

The frame member 40 is pivotally coupled to the frame member 40 with the mounting structure 44, which is comprised of two parallel plates 46 and 47, with plate 46 attached to the top surface of the frame member 40 and extending from the free end thereof in a cantilevered manner and plate 47 attached to the bottom surface of the frame member 40 and extending from the free end thereof in a cantilevered manner. The free end of the frame member 42 is sandwiched between and pivotally attached to the plates 46 and 47, as with a bolt and nut fastener inserted through the holes in the plates 46 and 47 and through a corresponding set of holes in the free end of the frame member 42. The attachment of the frame member 42 to the plates 46 and 47 allow for horizontal movement of the frame member 42 relative to the plates 46 and 47 but restricts movement in a vertical direction by the engagement of the abutting surfaces between the plates 46 and 47 and the frame member 42.

As previously discussed, the mounting structure 44 includes a ram mounting portion 44' that extends beyond the point of attachment of the frame member 42 to the mounting structure 44. In addition, a second ram mounting structure 48 also comprised of a pair of plates 49 and 50 is mounted to the frame members 21 and 42 proximate the location where the frame members 21 and 42 are joined together, with the plate 49 attached to the top of the frame members with a cantilevered ram attachment portion extending from a side of the frame member 42 and the plate 50 attached to the bottom of the frame members with a cantilevered ram attachment portion extending from a side of the frame member 42. The plates 49 and 50 are in parallel relationship and configured to receive and pivotally attach one end of a hydraulic cylinder 60 as with a bolt and nut fastener inserted through the holes in the plates 49 and 50 and through a corresponding set of holes in the end of the ram of the hydraulic cylinder 60. The opposite end of the hydraulic cylinder 60 is pivotally attached to and between the distal ends of the plates 46 and 47 as with a bolt and nut fastener inserted through the holes in the plates 46 and 47 and through a corresponding set of holes in the mounting end of the cylinder.

A hydraulic hand operated pump 70 is attached to the top surface of the frame member 42 with the end closest the mounting structure 44 spaced sufficiently therefrom so as to not contact the mounting structure 44 when the wheel dolly 10 is opened to receive a flat tire. The pump 70 is coupled to the cylinder 60 with a hose 62 so that hydraulic fluid in the pump 70 can be forced into the cylinder 60 to extend the ram of the cylinder 60 to close the wheel dolly 10. When it is desired to open the wheel dolly 10, the load release valve 64 can be opened to allow hydraulic fluid in the cylinder 60 to flow back through the hose 62 and into the pump 70. It should be noted that while the pump 70 and cylinder 60 have been described herein as being hydraulic, it is also contemplated that such actuators may be in the form of threaded actuators, pneumatic actuators or other linear actuators or rams known in the art.

Figure 2:
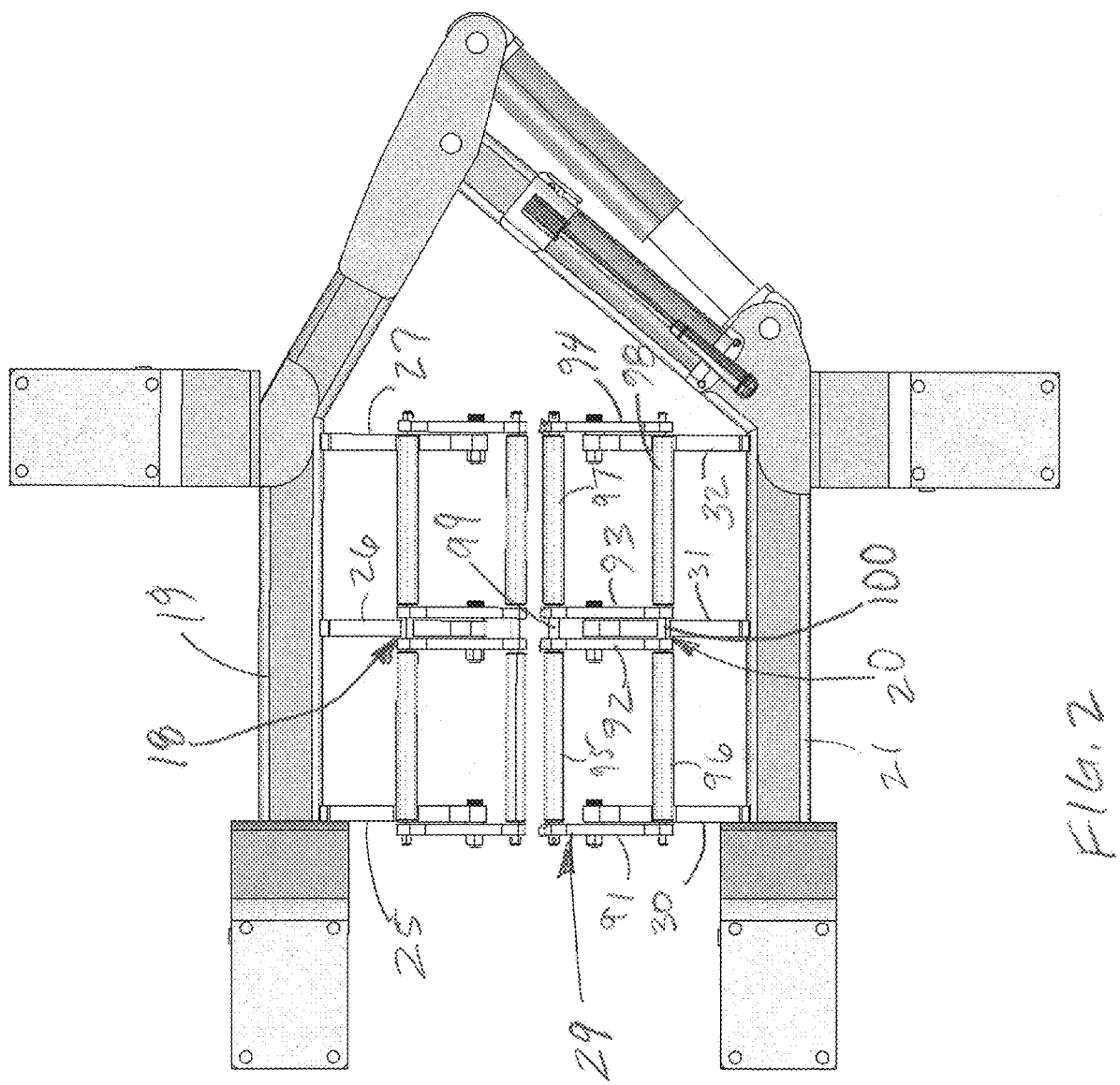
FIG. 2 is a first side view of the wheel dolly illustrated in FIG. 1.

As further shown in FIG. 2, the tire support assembly 20 is virtually identically configured to the tire support assembly 18 but in an opposed orientation. The tire support assembly 30 is comprised of a plurality of cantilevered support members 30-32 that are fixed to the frame member 21 and extend above the ground in a direction toward the frame member 19 such that when the frame assembly is in a closed or tire lifting position as shown, the distal ends of the support members 25, 26 and 27 are positioned proximate the support members 30, 31 and 32, respectively.

Pivotally attached to and between the distal ends of the support members 30-32 is a pivotable roller assembly 29. The pivotable roller assembly 29 is comprised of four roller pivot mounts 91-94 that are pivotally mounted to the three support members 30-32. Each roller pivot mount 91-94 is attached a point that is off center from the midpoint of the long axis of the roller pivot mount, with the attachment point being closer to the leading edge of the roller assembly 29. A set of four rollers 95-98 are each freely rotatably coupled to and between the roller pivot mounts 91-94 with rollers 95 and 96 coupled between the pivot mounts 91 and 92 and the rollers 97 and 98 coupled between the pivot mounts 93 and 94. Each of the pivot mounts 91-94 are also coupled together with rods 99 and 100 that extend through and between the pivot mounts 91-94 so that each of the pivot mounts 91-94 and associated rollers 95-98 pivot in unison. The rollers 95-58 each comprise a hollow cylinder, with rod 99 supporting rollers 95 and 97 and rod 100 supporting rollers 96 and 98 with the rollers being freely rotatable about the respective rods 99 and 100.

The support members 30-32 are evenly spaced along the frame member 21. Each of the roller support members 30-32 is generally in the form of a right triangle with the base of the roller support members 30-32 being parallel to the ground and the top surfaces of the roller support members 30-32 downwardly angled from their proximal ends that are attached to the frame member 21 in a cantilevered manner with the widest end of each roller support member 30-32 attached to a facing side of the frame 21 so as to inwardly extend toward the tire support assembly 18. Thus, the top sides of the support members 30-32 are downwardly angled and extend from the frame member 21 to create an effective downwardly angled surface between all roller support members 30-32 that is higher proximate the frame member 21 and lower as it downwardly tapers in a direction toward the opposite frame member 19. The roller support member 30-32 essentially form a plurality of inwardly extending cantilevered fins or ribs that are spaced apart and support the pivoting roller assembly 29.

When the roller assembly 29 is in the position as shown in FIG. 1, which is the position of the roller assembly 29 when supporting a tire of an aircraft, one end of the roller 96 rests upon a top surface of the support member 30, an opposite end of the roller 98 rests upon the support member 32 and a center portion of the rod 100 rests upon the top surface of the support member 31. Semicircular recesses are formed in the top surfaces of the support members 30-32 for receiving and supporting the rollers 96 and 98 and rod 100 when in the lifting position as shown.

As the leading rollers 95 and 97 come into contact with a flat tire, as will be shown and described in more detail, the leading rollers 95 and 97 of the roller assembly 29 are pivoted downward near the ground so that the rubber from the flat tire will not bunch up beneath the front rollers 95 and 97. As the rollers 95 and 97 continue to move into the flat tire and wheel area, the upper rollers 96 and 98 come into contact with the tire and wheel. The longer upper portions of the roller pivot mounts 91-94 are leveraged against the wheel forcing the pivot mounts 91-94 to pivot from a more vertical position to a more horizontal position thereby lifting the front rollers 95 and 97 away from the ground and correspondingly lifting the flat tire off the ground.

Figure 3:
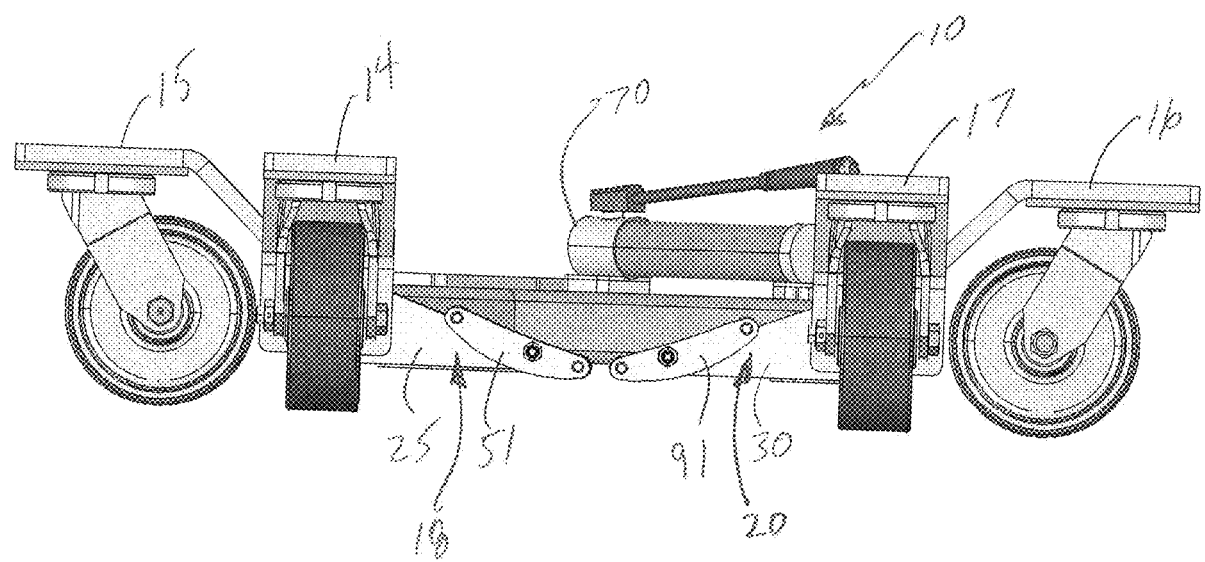
FIG. 3 is a top view of the wheel dolly illustrated in FIG. 1.

As shown in FIG. 3, when brought together, the tire support assemblies 18 and 20 and respective support members, such as support members 25 and 30 combined with the plurality of roller support members, such as roller support members 51 and 91 and respective upper and lower rollers (not visible) effectively form a V-shaped support surface for cradling and supporting above the ground one or more tires of an aircraft positioned thereon.

The tire support assemblies 18 and 20 can be actuated toward each other with the hydraulic cylinder and pump 70 assembly to controllably move the tire support assemblies 31 and 33 toward one another in order to capture and lift a flat tire of an aircraft off of the ground while still attached to the aircraft. That is, to capture a flat tire, the tire support assembles 18 and 20 are moved toward one another by the hydraulic cylinder from a position where a gap between leading rollers is wide enough to extend on opposite sides of the flat tire to a position where the tire support assemblies 18 and 20 are moved toward one another until the gap is reduced so that the tire support assemblies 18 and 20 fully support the flat tire with the roller support members 51 and 91 and roller members positioned under the flat tire. The wheel assemblies 14-17 then allow the wheel dolly 10 to be maneuvered by the flat tire in any direction. When the aircraft has been taxied from the runway, the tire support assemblies 18 and 20 are moved apart a sufficient amount to allow the flat tire to rest on the ground and the wheel dolly 10 to be removed from the flat tire.

Figure 4:
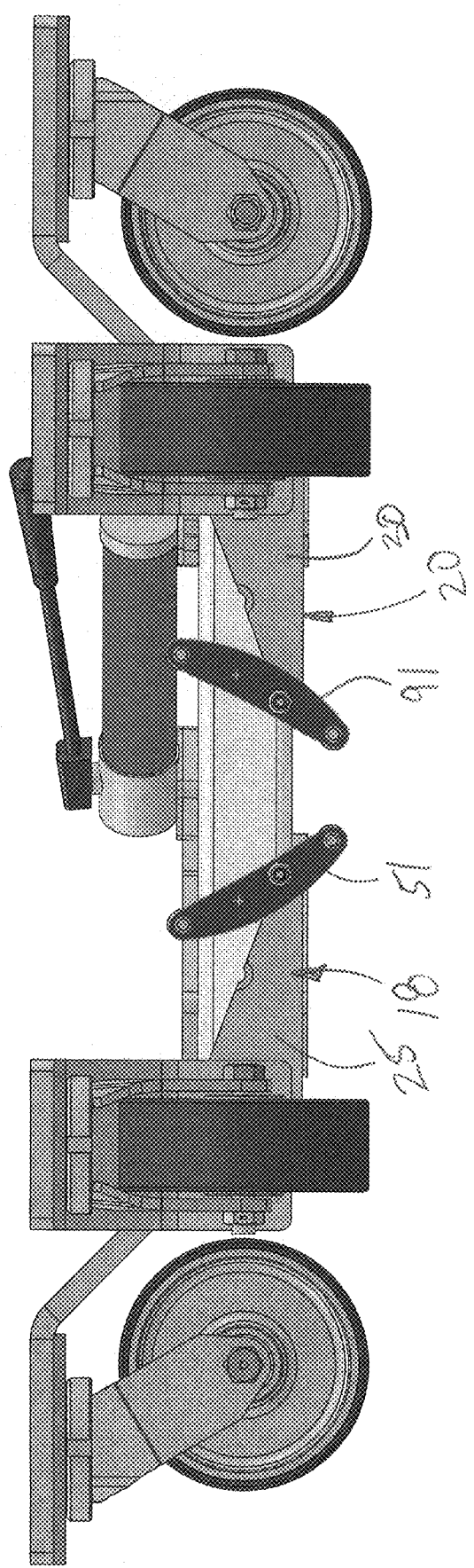
FIG. 4 is a second view of the wheel dolly illustrated in FIG. 1.

As shown in FIG. 4, the roller support members 51 and 91, and their associated roller members (as shown in FIGS. 1 and 2) are configured to freely pivot relative to respective roller support members 25 and 30. When engaging a flat tire, the lower roller members, defining the leading edges of the tire support assemblies 18 and 20, will engage the tire first. As the tire support assemblies 18 and 20 continue to be brought together, this engagement causes the roller mounts 51 and 91 to pivot relative to their respective support members from a more horizontal position as shown in FIG. 3 to a more vertical position as shown in FIG. 4. The roller mounts 51 and 91 will continue to pivot toward a more vertical position until the upper roller members of the roller mounts 51 and 91 engage the tire. Continuing to bring the tire support members together will cause more of the mass of the tire and thus the weight of the tire to move past the fulcrum of each of the roller mounts 51 and 91 where they are pivotally attached to the roller support members 25 and 30 until they return to the tire lifted position as shown in FIG. 3.

Figure 5:
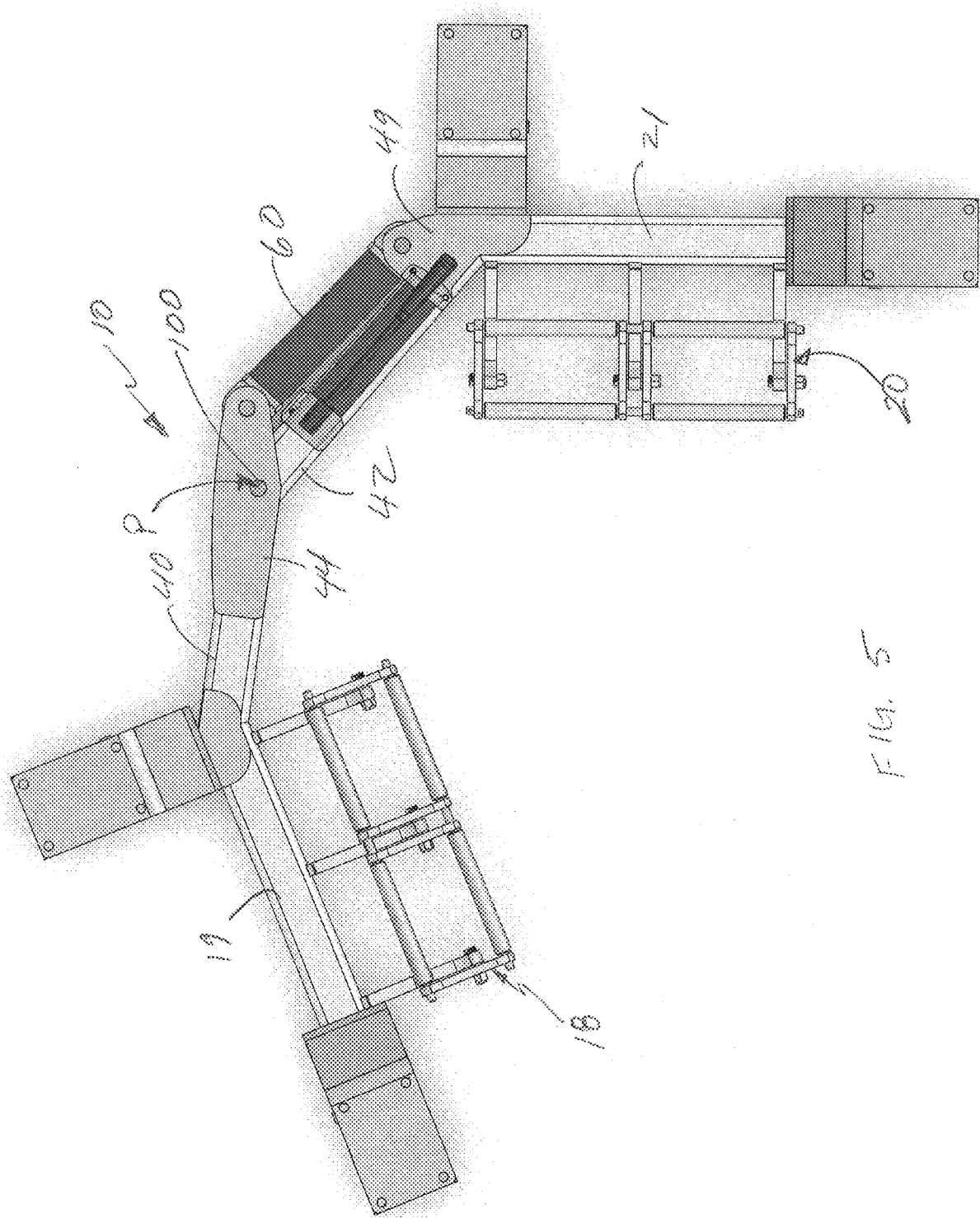
FIG. 5 is s top view of the wheel dolly illustrated in FIG. 1 with the second actuator in a disengaged position.

In FIG. 5, the wheel dolly 10 is shown in an open position for positioning the tire support assemblies 18 and 20 around a flat tire (not shown). The frame members 19 and 21 can be pivoted away from one another about the pivot point P where the frame members 40 and 42 are pivotally connected to one another via the bracket member 44 and pin 100 pinned together. When the frame members 40 and 42 are actuated away from one another to increase the angle between the frame members 40 and 42 as the hydraulic cylinder 60 (which is pivotally coupled between the bracket 44 and the bracket 49) is contracted, the tire support assemblies 18 and 20 are moved apart. The tire support assemblies 18 and 20 can be moved sufficiently apart so as to be able to be positioned on either side of a flat tire to be lifted.

Figure 6:
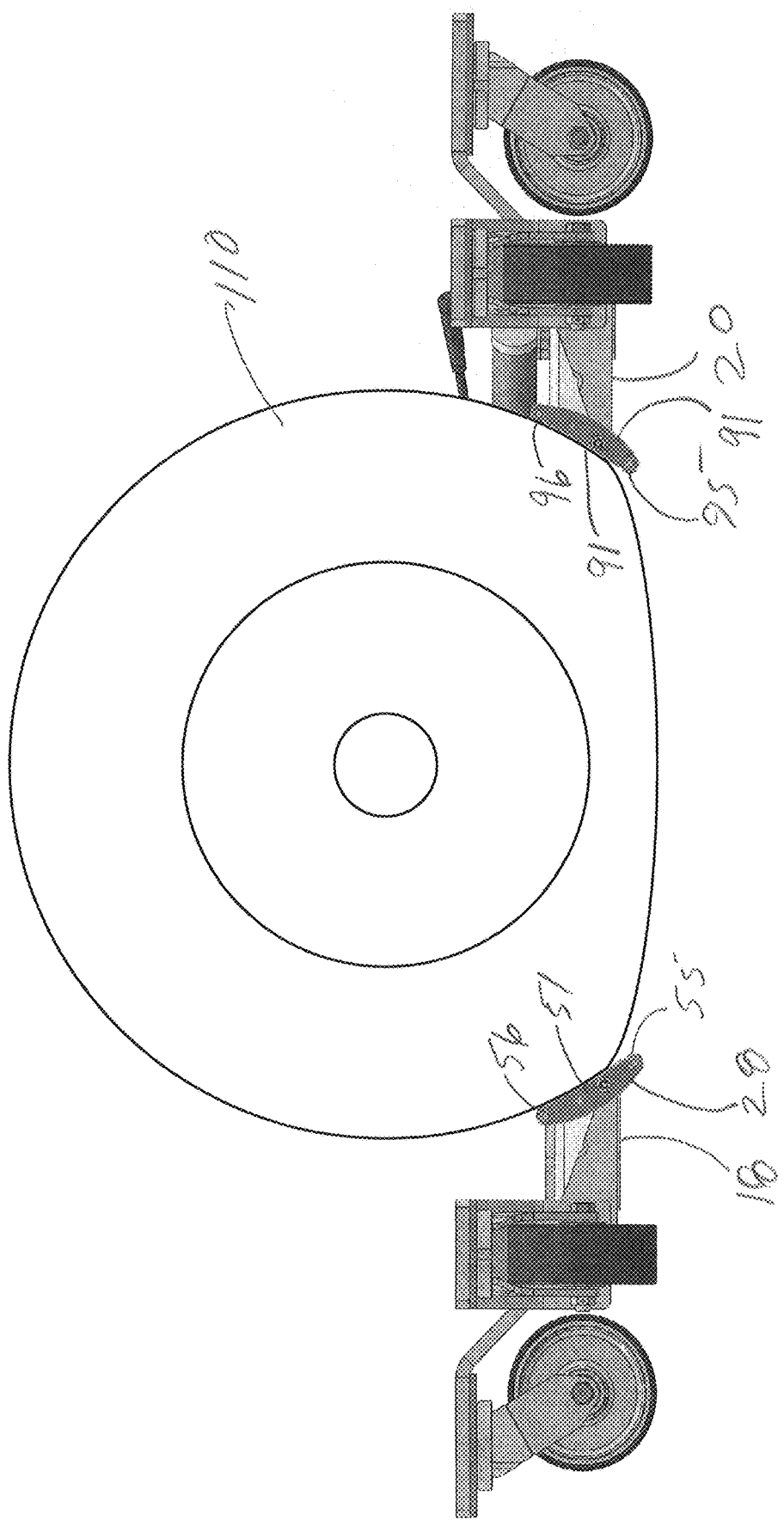
FIG. 6 is a top view of the wheel dolly illustrated in FIG. 1 supporting a pair of tires.

As shown in FIG. 6, as the tire support assemblies 18 and 20 are brought together around a flat tire 110 positioned on the ground, the leading rollers 55 and 95 come into contact with a flat tire 110 causing the roller assemblies 28 and 91 to be pivoted downward near the ground so that the rubber from the flat tire cannot bunch up beneath the front rollers 55 and 95. As the rollers 55 and 95 continue to move into the flat tire 110, the upper rollers 56 and 96 come into contact with the tire 110.

As shown in FIG. 7, as the longer upper portions of the roller pivot mounts 51 and 91 are leveraged by forced contact with the upper rollers 56 and 96 against the tire 110, the pivot mounts 51 and 91 are forced to pivot from a more vertical position (as shown in FIG. 6) to a more horizontal position thereby lifting the front rollers 55 and 95 away from the ground to thereby correspondingly lift the flat tire 110 off the ground, which can then be transported while still attached to the aircraft. The wheel assemblies 15 and 16 s the wheel assemblies 14 roll along the ground. It is noted that for added stability of the wheel dolly 10, the wheel support brackets 14', 17' are cantilevered in a direction parallel to the long axis of the respective frame members 19 and 21 (see FIG. 1) while the wheel support brackets 15' and 16' are cantilevered in a direction perpendicular to the long axis of the respective frame members 19 and 21 (see FIG. 1

As shown in FIG. 7, once the tire lifting assemblies 18 and 20 are sufficiently forced into engagement with the tire 110 so that the tire 110 is lifted off the ground, the tire lifting assemblies 18 and 20 rigidly hold the tire 110 in place relative to the tire lifting assemblies 18 and 20 such that the wheel dolly 10 fully supports the tire 110 and the wheel dolly allows the tire 110 (with aircraft attached) to be transported as the wheels 14", 15", 16" and 17" roll along the ground.

As illustrated in the figures, the wheel dolly 10 is configured to have a relatively low center of gravity so as to allow the wheel dolly 10 to have a relatively low profile and also to allow the wheel dolly 10 to be used over long distances of taxiing an aircraft without the possibility of the wheel dolly 10 being tipped or otherwise dislodged from the tire 110 it is supporting. This, in combination with the effective width of the wheel dolly 10 beyond the width of the tires being supported ensures that the wheel dolly 10 can provide safe and effective transport of, for example, a dual wheel and tire still attached to an aircraft as the aircraft is taxied from a runway. As previously discussed, each wheel assembly 14-17 is coupled to the frame 12 proximate the effective corners thereof. The wheels 14"-17" are self-orienting and freely rotatable relative to the frame 12 such that the axis of rotation of each wheel of the castor is vertically and horizontally offset from the center or rotation at the location where the wheel is attached to the frame 12. Thus, depending on the direction of movement of the frame 12, the wheels will self-orient themselves, since they are freely rotatable a full 360 degrees, and will roll in a proper direction relative to the movement of the frame 12, much like a wheel on a shopping cart. The attachment brackets 14'-17' depend from and are upwardly angled away from the frame members 19 and 21 so as to allow for larger sized wheels 14"-17" to be utilized while still maintaining a relatively low center of gravity of the wheel dolly 10 as well as positioning the tire support assemblies 18 and 20 at ground level. The wheels 14"-17" may be bolted to the respective brackets 14'-17' so as to allow replacement of a wheel if the wheel becomes damaged during use.

The frame assembly 12 and tire lifting assemblies 18 and 20 (see FIG. 1) are comprised of metal, such as aluminum, steel or other metals known in the art. The roller members 55-59 and 95-98 may also be formed from metal or from a durable rubber or plastic material known in the art. The roller members 55, 57, 95 and 97 effectively form the leading or tire engaging ends of the tire lifting assemblies 18 and 20. The roller members 56, 58, 96 and 98 then also guide and support the tire up the tire lifting assemblies 18 and 20 as the tire moves up the tire lifting assemblies 18 and 20. The first set of roller members 55 and 57 of the first lifting assembly 18 and the first set of roller members 95 and 97 of the second lifting assembly 18 are arranged in a row along the distal ends of the respective roller support members 51-54 and 91-94. The rollers 55-59 and 95-98 prevent any additional damage to the tire as the tire lifting assemblies 18 and 20 are forced under the tire by providing rolling contact between the tire and the tire lifting assemblies 18 and 20, with the understanding that the weight of the aircraft on a flat tire will tend to make it difficult to slide an object under the tire. Thus, the tire lifting assemblies 18 and 20 can be forced under a flat tire that is still attached to an aircraft without further damaging the tire in order to successfully lift and support the aircraft tire with the wheel dolly 10 of the present invention.

The wheel dolly may include a pull handle attached to the frame assembly 12. Likewise, a tether or tug member can be attached to the frame assembly to pull the wheel dolly 10 to a desired location.

While the wheel dolly of the present invention has been described with reference to certain illustrative embodiments to illustrate what is believed to be the best mode of the invention, it is contemplated that upon review of the present invention, those of skill in the art will appreciate that various modifications and combinations may be made to the present embodiments without departing from the spirit and scope of the invention as recited in the claims. The claims provided herein are intended to cover such modifications and combinations and all equivalents thereof. Reference herein to specific details of the illustrated embodiments is by way of example and not by way of limitation.

Thus, aspects and applications of the invention presented here are described in the drawings and in the foregoing detailed description of the invention. Those of ordinary skill in the art will realize that the description of the present invention is illustrative only and not in any way limiting. Other embodiments of the invention will readily suggest themselves to such skilled persons including, without limitation, combinations of elements of the various embodiments. Various representative implementations of the present invention may be applied to any tie down cargo restraining system.

Unless specifically noted, it is intended that the words and phrases in the specification and the claims be given their plain, ordinary, and accustomed meaning to those of ordinary skill in the applicable arts. It is noted that the inventor can be his own lexicographer. The inventor expressly elects, as his own lexicographer, to use the plain and ordinary meaning of terms in the specification and claims unless they clearly state otherwise in which case, the inventor will set forth the "special" definition of that term and explain how it differs from the plain and ordinary meaning. Absent such statements of the application of a "special" definition, it is the inventor's intent and desire that the simple, plain and ordinary meaning to the terms be applied to the interpretation of the specification and claims.

The inventor is also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventor is fully informed of the standards and application of the special provisions of 35 U.S.C. § 112(f). Thus, the use of the words "function," "means" or "step" in the Detailed Description of the Invention or claims is not intended to somehow indicate a desire to invoke the special provisions of 35 U.S.C. § 112(f) to define the invention. To the contrary, if the provisions of 35 U.S.C. § 112(f) are sought to be invoked to define the inventions, the claims will specifically and expressly state the exact phrases "means for" or "step for" and the specific function (e.g., "means for heating"), without also reciting in such phrases any structure, material or act in support of the function. Thus, even when the claims recite a "means for . . . " or "step for . . . " if the claims also recite any structure, material or acts in support of that means or step, or that perform the recited function, then it is the clear intention of the inventor not to invoke the provisions of 35 U.S.C. § 112(f). Moreover, even if the provisions of 35 U.S.C. § 112(f) are invoked to define the claimed inventions, it is intended that the inventions not be limited only to the specific structure, material or acts that are described in the illustrated embodiments, but in addition, include any and all structures, materials or acts that perform the claimed function as described in alternative embodiments or forms of the invention, or that are well known present or later-developed, equivalent structures, material or acts for performing the claimed function.

What is claimed:

1. A wheel dolly for temporarily lifting and transporting a flat tire attached to an aircraft, comprising:
    a frame assembly supported above a surface by a plurality of freely rotatable wheel assemblies, the frame assembly comprising;
    first and second frame members coupled together via a first angled frame member having a distal end fixedly attached at a first angle to a proximal end of the first frame member and a second angled frame member having a distal end fixedly attached at a second angle to a proximal end of the second frame member, the first angled frame member having a proximal end pivotally coupled to a proximal end of the second angled frame member;

a ram having a first end pivotally coupled to the frame assembly proximate the proximal ends of the first and second angled frame members and a second end pivotally coupled to the frame assembly proximate the proximal end of the second frame member;

first and second oppositely opposed tire support assemblies attached to the frame assembly, the first tire support assembly comprising a first tire support structure attached to the first frame member of the frame assembly and a second tire support structure attached to the second frame member of the frame assembly, each tire support assembly facing one another in opposite directions when the first and second oppositely opposed tire support assemblies are in a tire lifting position, the first tire support assembly comprised of a first plurality of cantilevered support members having a proximal end fixed to the first frame member and extending in a direction toward the second frame member, the second tire support assembly comprised of a second plurality of cantilevered support members having a proximal end fixed to the second frame member and extending toward the first frame member such that when the frame assembly is in the tire lifting position distal ends of the first plurality of cantilevered support members are positioned proximate distal ends of the second plurality of support members;

a first pivotable roller assembly pivotally coupled to the distal ends of the first plurality of cantilevered support members; and a second pivotable roller assembly pivotally coupled to the distal ends of the second plurality of cantilevered support members;

whereby extension of the ram causes an angle between the first and second angled frame members to decrease, thereby moving the first and second tire support structures toward one another and retraction of the ram causes the angle between the first and second angled frame members to increase thereby correspondingly moving the first and second tire support structures away from one another.

2. The wheel dolly of claim 1, further comprising a first mounting assembly fixedly attached to and depending from the proximal end of the first angled frame member, the proximal end of the second angled frame member pivotally connected to the first mounting assembly at a pivoting connection, the first mounting assembly having an extended portion extending beyond the pivoting connection, and the first end of the ram pivotally coupled to the extended portion of the first mounting assembly a distance from the pivoting connection.

3. The wheel dolly of claim 2, wherein the first mounting assembly comprises a first plate attached to and extending from a top surface of the first angled frame member and a second plate parallel to the first plate and extending from a bottom surface of the first angled frame member.

4. The wheel dolly of claim 3, wherein the proximal end of the second angled frame member is pivotally coupled to the first and second plates of the first mounting assembly to allow for horizontal pivotal movement of the second angled frame member relative to the first and second plates, the first and second plates restricting movement of the second angled frame member relative to the first and second plates in a vertical direction by an engagement of the first and second plates with the second angled frame member.

5. The wheel dolly of claim 2, further comprising a second mounting assembly attached to and depending from proximate the proximal end of the second frame member, the second end of the ram pivotally coupled to the second mounting assembly so that extension or retraction of the ram causes the first mounting member to pivot relative to the proximal end of the second angled frame member thereby moving the first tire support structure relative to the second tire support structure.

6. The wheel dolly of claim 1, wherein the first angled frame member is angled relative to the first frame member approximately 150 degrees and the second angled frame member is angled relative to the second frame member approximately 135 degrees, with the angle formed between the first and second angled frame members being approximately 75 degrees when the first and second oppositely opposed tire support assemblies are in the tire lifting position.

7. The wheel dolly of claim 1, wherein the first pivotable roller assembly comprises a first plurality of roller pivot mounts pivotally mounted to the first plurality of cantilevered support members and the second pivotable roller assembly comprises a second plurality of roller pivot mounts pivotally mounted to the second plurality of cantilevered support members.

8. The wheel dolly of claim 7, wherein each of the first plurality of roller pivot mounts is attached at a first attachment point that is off center from a midpoint of a long axis of each of the first plurality of roller pivot mounts, with the first attachment point being closer to a leading edge of the first pivotable roller assembly and wherein each of the second plurality of roller pivot mounts is attached at a second attachment point that is off center from a midpoint of a long axis of each of the second plurality of roller pivot mounts, with the second attachment point being closer to a leading edge of the second pivotable roller assembly.

9. The wheel dolly of claim 8, further comprising a first set of rollers each roller of the first set of rollers being rotatably coupled to and between a respective pair of the first plurality of roller pivot mounts and a second set of rollers each roller of the second set of rollers being rotatably coupled to and between a respective pair of the second plurality of roller pivot mounts.

10. The wheel dolly of claim 9, wherein the first plurality of roller pivot mounts is coupled together with a first plurality of rods and the second plurality of roller pivot mounts is coupled together with a second plurality of rods.

11. The wheel dolly of claim 10, wherein the first set of roller pivot mounts are coupled together by the first plurality of rods so that each of the first plurality of pivot mounts and each of the first plurality of rollers pivot in unison.

12. The wheel dolly of claim 11, wherein the second set of roller pivot mounts are coupled together by the second plurality of rods so that each of the second plurality of pivot mounts and each of the second plurality of rollers pivot in unison.

13. The wheel dolly of claim 12, wherein each of the first plurality of rollers comprises a hollow cylinder with a respective one of the first plurality of rods extending through a corresponding one of the first plurality of rollers and through and between each of the respective first plurality of roller pivot mounts and wherein each of the second plurality of rollers comprises a hollow cylinder with a respective one of the second plurality of rods extending through a corresponding one of the second plurality of rollers and through and between each of the respective second plurality of roller pivot mounts.

14. The wheel dolly of claim 1, wherein each of the first plurality of cantilevered support members is generally in the form of a right triangle having a base configured to be substantially parallel to a support surface of the wheel dolly and having a top surface downwardly angled relative to its base from its proximal end that is attached to the first frame member so that the first plurality of cantilevered support members create an effective downwardly angled surface that is downwardly angled from the first frame member and wherein each of the second plurality of cantilevered support members is generally in the form of a right triangle having a base configured to be substantially parallel to the support surface of the wheel dolly and having a top surface downwardly angled relative to its base from its proximal end that is attached to the second frame member so that the second plurality of cantilevered support members create an effective downwardly angled surface that is downwardly angled from the second frame member.

15. The wheel dolly of claim 14, wherein in the tire lifting position upper rollers of the first set of rollers rest upon respective top surfaces of the first plurality of cantilevered support members and upper rollers of the second set of rollers rest upon respective top surfaces of the second plurality of cantilevered support members.

16. The wheel dolly of claim 14, wherein in the tire lifting position a center portion of at least one of the first plurality of rods rests upon a respective top surface of one of the plurality of first cantilevered support members and a center portion of at least one of the second plurality of rests upon a respective top surface of one of the second plurality of cantilevered support members.

17. The wheel dolly of claim 1, wherein the first plurality of cantilevered support members are evenly spaced along the first frame member and the second plurality of cantilevered support members are evenly spaced along the second frame member.

18. The wheel dolly of claim 17, wherein as leading rollers of the first and second sets of rollers come into contact with a flat tire the leading rollers and their respective first and second pivotable roller assemblies are pivoted to a more vertical position.

19. The wheel dolly of claim 18, wherein as upper rollers of the first and second pivotable roller assemblies come into contact with the flat tire, upper portions of the first and second roller pivot mounts are forced to pivot from the more vertical position to a more horizontal position thereby lifting the leading rollers of the first and second sets of rollers away from the support surface and correspondingly lifting the flat tire off the support surface.

20. The wheel dolly of claim 1, further comprising a pump attached to a top surface of the second angled frame member adjacent the ram, the pump in fluid communication with the ram so that the pump, when actuated, can force the ram to extend to thereby move the first and second tire support assemblies into the tire lifting position.

* * * * *